June 19, 1962  R. HUBER  3,040,114
PRIMARY BATTERY CELL
Filed May 14, 1959

INVENTOR.
RICHARD HUBER
BY
AGENT

United States Patent Office 3,040,114
Patented June 19, 1962

3,040,114
PRIMARY BATTERY CELL
Richard Huber, Ellwangen (Jagst), Germany, assignor to Pertrix Union Gesellschaft mit beschränkter Haftung, Ellwangen (Jagst), Germany, a corporation of Germany
Filed May 14, 1959, Ser. No. 813,112
11 Claims. (Cl. 136—83)

The present invention relates to primary battery cells comprising an anodic or dissolving electrode, a cathodic or depolarizing electrode, and a gelatinous electrolyte.

Presently used primary cells have an alkaline, neutral or, at the most, weakly acid electrolyte because it has not been possible to prevent undue corrosion of the dissolving electrode and even dissolving of the depolarizing electrode if the electrolyte were strongly acid, commonly used depolarizing materials, such as manganese dioxide and others, being soluble in acid. Also, strongly acid electrolytes resisted gelatinization with the swelling agents commonly used for dry cell electrolytes.

Magnesuim, zinc, or aluminum chlorides have long been used as electrolyte components in primary cells. The pH value of solutions of these salts is about 4.0 to 5.5, a zinc chloride solution, for instance, having a pH of about 4.0. Leclanche cells also have electrolytes with such a pH range.

While, for instance, Bunsen and Grove cells in the early development of primary cells had more strongly acid electrolytes, their zinc electrodes were strongly attacked by the electrolyte during inactive periods so that it was necessary to provide tilting devices for emptying the electrolyte from the cell into a storage container when the cell was not in use.

Storage battery cells with a rechargeable zinc-lead dioxide system have been provided with sulfuric acid electrolytes. In such secondary cells, however, the electrolyte is not gelatinized and the depolarizer is not corroded by acids. Thus, there is no need for any special measures to protect the depolarizer and while the zinc electrode in storage battery cells is corroded when the battery is out of use, the dissolved zinc is deposited on the negative electrode again when the battery is charged.

Since it s a theoretically established fact that more strongly acid electrolytes produce more efficient battery cells, it is a desirable object to produce primary cells with such electrolytes.

It is accordingly an object of the present invention to produce primary battery cells with a relatively strongly acid electrolyte with a view to increasing the capacity of such cells over that of conventional primary cells without corroding the dissolving electrode and/or dissolving the depolarizing electrode.

It is another object of this invention to make primary battery cells whose discharge voltage curve is relatively flat.

The above and other objects and advantages are accomplished according to the invention by providing an electrolyte consisting of an acid and an acid-soluble oxide or hydroxide of a metal of the same normal electrode potential as, or more electronegative than, the metal of the dissolving electrode, the pH value of the electrolyte being between about −1.0 and +0.7, preferably about 0.0.

Preferably, a black mix of manganese dioxide and carbon is used as depolarizing electrode of the primary cell while the electrolyte acid is a non-oxidizing acid.

In accordance with a preferred embodiment of the present invention, the electrolyte acid has a concentration of about 2 N to 4 N, preferably about 3 N, and the amount of the added acid-soluble oxide or hydroxide is such that the electrolyte has a residual acid concentration of about N concentration.

While the above-described features of the invention will increase the capacity of a primary cell without substantially decreasing the useful life of the electrodes, it is often desired to obtain a relatively even voltage output, even if this may involve a certain decrease in capacity. This may be accomplished according to another preferred embodiment of this invention by decreasing the weight proportion of the depolarizing oxide, such as manganese dioxide, in the cathode to that of the pure acid, such as hydrochloric acid, in the electrolyte to less than 7:1, preferably toward a ratio of 1:1.

According to a preferred method of preparing the novel electrolyte, a suitable oxide or hydroxide is slowly added to the aqueous acid solution while the solution is continuously stirred, sal ammoniac being preferably added simultaneously, and the thus obtained electrolyte liquid having normal room temperature is added to a swelling medium until a homogeneous, gelatinous paste is obtained.

The above and other objects, features and advantages of this invention will be more fully explained in the following detailed description of one embodiment of a primary cell constructed according to the invention, as illustrated in the accompanying drawing, it being fully understood that the illustrated cylindrical cell constitutes only one possible form of primary cell to which the invention is applicable.

Figure 1:
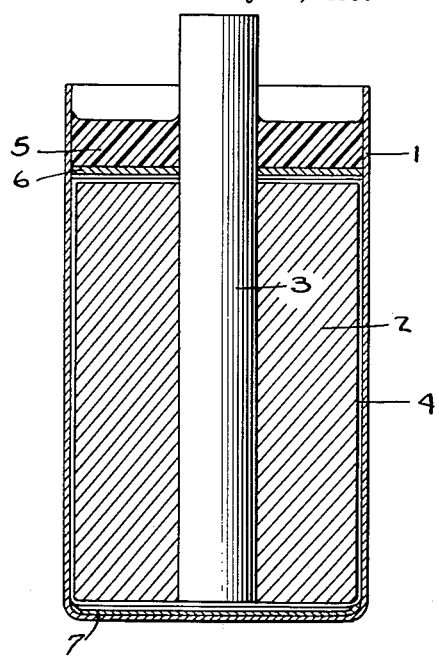
FIG. 1 is a vertical section of a primary cell.

Referring now to FIG. 1, there is shown a cylindrical dry cell comprising the conventional zinc cup or can 1 containing the bobbin 2 of depolarizing mix. The depolarizing mix may consist of the conventional mixtures of manganese dioxide and graphite or some form of carbon black, with the conventional additions of solid salts, i.e. sal ammoniac.

Merely by way of example and in no way limiting the invention thereto, the following depolarizing compositions have been found suitable for the primary cells of this invention, all parts being by weight.

| Dry depolarizing mixture | parts by weight | parts by weight |
|---|---|---|
| Manganese dioxide | 80 | 75 |
| Acetylene black | 20 | 20 |
| Graphite | 0 | 5 |
| | 100 | 100 |
| added electrolyte | 60 | 60 |

By way of example the following compositions of electrolyte have been found suitable:

| | parts by weight | parts by weight | parts by weight |
|---|---|---|---|
| Sal ammoniac | 28.2 | 0 | 0 |
| Zinc chloride | 7.8 | 0 | 0 |
| Water | 64.0 | 0 | 0 |
| 3 N hydrochloric acid | 0 | 93.1 | 0 |
| 3 N sulfuric acid | 0 | 0 | 94.9 |
| Zinc chloride | 0 | 0 | 5.1 |
| Calcium chloride | 0 | 6.9 | 0 |
| | 100 | 100 | 100 |
| Mercuric chloride | 0.3–0.5 | 0.3–0.5 | 0 |
| Mercuric sulfate | 0 | 0 | 0.4–0.6 |

Each of the electrolyte solutions can be used for wetting one of the mixtures described above.

Any other conventional black mix is useful for the depolarizing or cathodic electrode of the primary cell.

The depolarizing mix is wetted with an 0.1 N to 1 N acid solution, preferably an 0.3 N acid solution, containing a suitable amount of oxides of metals of the second group of the periodic system and of mercuric chloride and with or without conventional inhibitors.

Suitable acids include sulfuric acid, hydrochloric acid, and mixtures thereof, hydrochloric acid being preferred.

If the above indicated solutions of the acid were added to the conventional thickening agents, such as flour, starch, or cellulose derivatives, no gelatinous paste would be obtained, as desirable for dry cells. Therefore, an originally stronger acid solution, for instance a 3 N hydrochloric acid is mixed with a sufficient amount of an acid-soluble oxide or hydroxide buffer to cut the ultimate acid concentration to an N concentration. If such an electrolyte solution is added to a gelatinizing agent, for instance, flour, a gelatinous paste is obtained which is similar in its consistency to the pastes obtained conventionally with alkaline, neutral, or slightly acid electrolytes.

The admixed oxides and hydroxides are preferably zinc or calcium oxides and hydroxides. The use of zinc oxide has the particular advantage that the high concentration of zinc ions makes the zinc anode 1 more electropositive, thereby reducing the amount of mercuric chloride and/or organic inhibitors required for an efficient operation of the cell.

In accordance with the present invention, primary cells have been constructed, which comprise a zinc amalgam can constituting the dissolving electrode, a manganese dioxide carbon black mixture constituting the depolarizing electrode, and an electrolyte made of 3 N hydrochloric acid and a zinc oxide buffer, 6 g. to 9 g. of zinc oxide being used per 100 g. of the aqueous hydrochloric acid solution. The electrolyte contained the usual amounts of sal ammoniac (ammonium chloride) and was gelatinized with the usual media, such as flour, starch, cellulose derivatives, such as the carboxymethyl cellulose, and the like. The indicated addition of zinc oxide reduces the concentration of the acid solution to an about N concentration.

Experiments have shown that a pure N hydrochloric acid solution without zinc oxide addition does not have the advantageous properties of an electrolyte whose concentration has been reduced by a buffer. Thus, an N aqueous hydrochloric acid solution without zinc oxide content produces a considerably smaller capacity increase than the threefold increase produced with a buffered acid electrolyte. Furthermore, such a pure acid solution causes corrosion of the anode and dissolution of the manganese dioxide in the cathode mix. Finally, it resists proper gelatinization with the conventional swelling agents, mentioned hereinabove.

These comparative tests show that the advantages of the new electrolyte do not depend on the concentration of the acid solution but more particularly on the buffer contained therein.

As is conventional, a carbon rod 3 is centrally embedded in the black depolarizing mix and serves as a conductor of the electric current from within the cell to its exterior positive terminal. As is also conventional, the cell is sealed at 5, wax, pitch, or other suitable sealing materials being useful. Seal 5 is supported on a washer 6 of impregnated cardboard, for instance, a bottom washer 7 being provided in the zinc can 1 to support the depolarizing bobbin 2.

An absorptive paper layer 4 is arranged between the bobbin 2 and can 1. This paper layer serves as electrolyte carrier and may carry a coating or film of swellable material on the surface facing the zinc can. A suitable swellable material is the aluminum salt of the carboxymethyl cellulose with or without a layer of the usual electrolyte paste such as 90 parts of water
10 parts of ammonium chloride
14 parts of flour or starch The amount of the electrolyte wetting the bobbin 2 is so selected that sufficient electrolyte is absorbed by the carrier 4 to wet it through and through.

If emphasis is to be placed on a relatively even voltage output of the cell, the quantity of manganese dioxide relative to the quantity of pure acid therein is made smaller than the spatial relationship would normally permit. This is accomplished in accordance with the invention in cylindrical cells by making the diameter of bobbin 2 smaller than usual, for instance 18 to 20 mm. instead of 26 mm., the usual size of a D-size cell bobbin, so that there is a relatively large interspace between the bobbin 2 and the zinc can 1. In flat cells, the same purpose is accomplished by making the depolarizer mix cakes of less thickness and the absorptive paper layer of greater thickness than usual.

The voltage output will be relatively constant if the weight proportion of depolarizing oxide to that of pure electrolyte acid is less than 7:1, preferably approaching 1:1.

The electrolyte, for the paste layer, between bobbin and zinc can, of this invention may be advantageously prepared by adding the oxide or hydroxide, such as zinc oxide, slowly to the aqueous acid solution while constantly stirring the mixture. Sal ammoniac is preferably stirred into the solution at the same time. The electrolyte liquid is then added to the swelling agent until a homogeneous mixture is obtained.

Suitable compositions are for example:

| | | |
|---|---|---|
| 3 N hydrochloric acid, ml | 1.000 | 1.000 |
| Zinc oxide, g | 81.37 | 0 |
| Calcium oxide, g | 0 | 56.1 |
| Wheat flour, g | 140–160 | 14–160 |
| Starch, g | 70–80 | ~0–80 |
| Inhibitor, g | 1 | 1 |
| Sal ammoniac, g | 250 | 250 |
| HgCl$_2$, g | 30 | 30 |

In a D-size cell for instance with a bobbin of a diameter of 20 mm. and a height of 40 mm., the weight proportion of depolarizing oxide to that of pure electrolyte acid is 6.8:1.

This method has the following advantages:

Addition of zinc oxide to an aqueous hydrochloric acid solution, for instance, causes the development of considerable heat. On the other hand, the addition of ammonium chloride causes cooling of the mixture. When zinc oxide and sal ammoniac are added simultaneously in the amounts suitable for the electrolyte formation, practically no temperature change takes place and the electrolyte liquid may be added to the gelatinizing agent without further cooling or heating, being substantially at room temperature. This simplifies and facilitates the electrolyte production considerably.

Obviously, the invention is applicable to primary cells of all types, including cylindrical and flat cells. In air-depolarized primary cells, it is advantageous to keep down the amount of zinc ions in the cell. Therefore, it is preferred to add an earth alkaline metal oxide, such as calcium oxide, to the electrolyte acid, instead of zinc oxide.

A suitable composition for the mix is:

| | parts by weight | parts by weight |
|---|---|---|
| Active Carbon | 48.5 | 35 |
| Acetylene black | 13.5 | 0 |
| Graphite | 0 | 25 |
| Sal ammoniac | 38 | 40 |
| 3 N hydrochloric acid | 51 | 16.7 |
| Calcium oxide | 4 | 1.3 |

As electrolyte paste can be used the composition which contains wheat flour and calcium oxide and is mentioned above.

Figure 2:
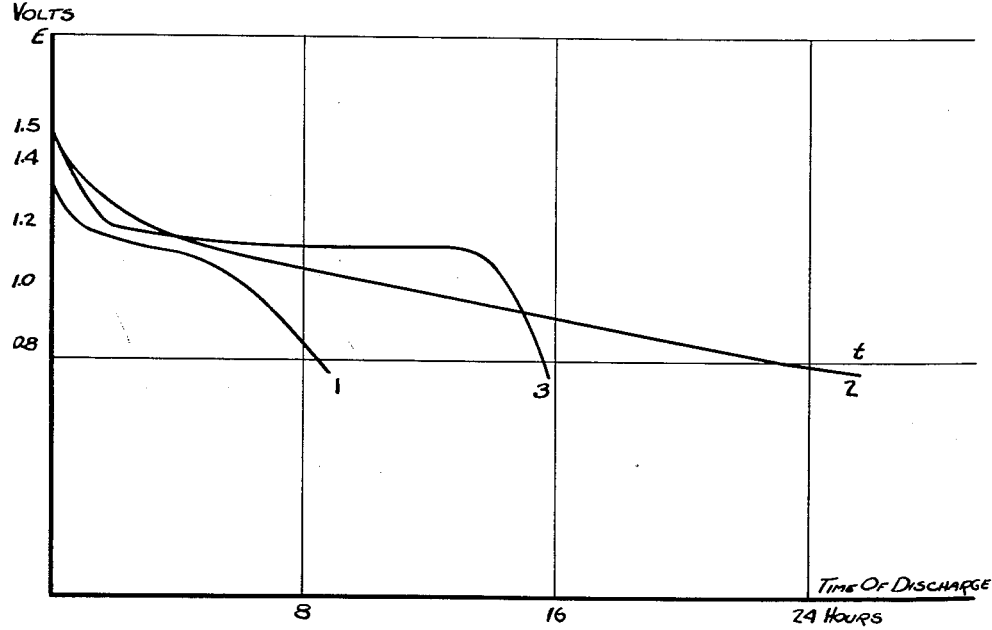
FIG. 2 is a graph showing comparative discharge voltage curves.

FIG. 2 shows three discharge voltage curves of D-size cells to illustrate one of the advantages of primary cells with an electrolyte according to the present invention. In the graph, the abscissa $t$ indicates time while the ordinate E indicates the voltage at the cell terminal during discharge. Curve 1 illustrates an output curve of a conventional primary cell. Curve 2 shows the output curve of a primary cell with an electrolyte according to the present invention, the proportion of the quantity of manganese dioxide to pure hydrochloric acid being more than 7:1, which would be the normal ratio if the spatial relationships are the usual ones. As can be seen, curve 2 shows a considerably larger cell capacity than curve 1, the output of the cell being also more even than in curve 1 (which is indicated by curve 2 being flatter than curve 1).

If it is desirable to make the output even more constant, the ratio of manganese dioxide to pure hydrochloric acid is reduced to less than 7:1, by weight, thus producing output curve 3. As can be seen, this reduces the cell capacity (which is still higher than in the usual cells represented by curve 1) but makes the output substantially constant during most of the discharge. Immediately after the onset of the discharge, the curve flattens and then drops suddenly when the capacity has been almost exhausted. In this way, the discharge curve 3 is quite similar to that of a secondary cell.

The three tested types of cells represented by curves 1, 2 and 3 were D-size cells and discharge was effected continuously over 5 ohms. The curves show the characteristic advantages of the invention. Substantially the same curves were obtained with fresh cells as well as with cells which had been stored for 12 months.

Extensive tests showed the following:

(1) The addition of an acid-soluble oxide or hydroxide buffer to the originally highly concentrated acid produces an electrolyte which causes neither undue corrosion of the dissolving electrode or decomposition of the depolarizer. The dissolving electrode is amalgamated in the conventional manner. The amount of mercury is about 0.3% of the metal of the dissolving electrode. The conventional zinc amalgamated electrodes for strong acid or alkaline electrolytes contain about 10% mercury and 90% zinc.

(2) While the electrolyte is sufficiently neutralized by the addition to prevent unwanted reactions with the electrodes, the efficiency of the acid electrolyte in increasing the capacity of the cell is almost unimpaired, the cell capacity being up to three times that of conventional primary cells.

(3) Less amalgamation of the anodic electrode was needed than in conventional zinc amalgam electrodes.

(4) The gelatinizing agents could be homogeneously mixed with the electrolyte of this invention in the same manner as conventional electrolytes and formed similar gelatinous electrolyte pastes.

(5) The shelf life of the novel primary cells was at least as long as that of conventional cells.

(6) The primary cells according to the present invention could be produced on the conventional machines and without difficulty, thus eliminating any added production costs.

It will be seen, therefore, that primary cells of greatly increased capacity and/or relatively constant output voltage may be manufactured in accordance with this invention without increase in costs.

I claim:

1. A galvanic primary cell comprising, in combination, a dissolving metal electrode, a solid depolarizing electrode comprising manganese dioxide, and placed therebetween a gelatinous electrolyte comprising an acid and an acid-soluble buffer compound selected from the group consisting of oxides and hydroxides of metals of the second group of the periodic system, the pH value of the electrolyte being between about $-1.0$ and $+0.7$.

2. The galvanic primary cell of claim 1, wherein the pH value of the electrolyte is about 0.0.

3. The galvanic primary cell of claim 1, wherein the base material of the depolarizing electrode is selected from the group consisting of manganese dioxide and carbon, and the electrolyte acid is a non-oxidizing acid.

4. The galvanic primary cell of claim 1, wherein said acid is selected from the group consisting of hydrochloric acid, sulfuric acid and mixtures thereof.

5. The galvanic primary cell of claim 1, wherein said metal of said buffer compound is zinc.

6. The galvanic primary cell of claim 1, wherein said metal of said buffer compound is calcium.

7. The galvanic primary cell of claim 1, wherein said electrolyte acid has a concentration between about 2 N and 4 N and the electrolyte contains a sufficient quantity of said buffer to cut the residual acid concentration of the electrolyte to an N concentration.

8. A galvanic primary cell comprising, in combination, a dissolving electrode of zinc amalgam, a solid depolarizing electrode comprising a black mix of manganese dioxide and carbon, and placed therebetween a gelatinous electrolyte comprising a mixture of 3 N hydrochloric acid solution, zinc oxide, sal ammoniac, and a gelatinizing agent, about 6 parts to 9 parts by weight of zinc oxide being present per 100 parts by weight of the acid solution and the pH value of the electrolyte being between about $-1.0$ and $+0.7$.

9. The galvanic primary cell of claim 8, wherein the weight proportion of the manganese dioxide to pure hydrochloric acid is less than 7:1.

10. The galvanic primary cell of claim 9, wherein the weight proportion of manganese dioxide to pure hydrochloric acid approaches about 1:1.

11. A gelatinous electrolyte for a galvanic primary cell, comprising a mixture of 3 N hydrochloric acid solution, zinc oxide, sal ammoniac, and a gelatinizing agent, about 6 parts to 9 parts by weight of zinc oxide being present per 100 parts by weight of the acid solution and the pH value of the electrolyte being between about $-1.0$ and $+0.7$.

References Cited in the file of this patent

UNITED STATES PATENTS

| | | |
|---|---|---|
| 503,415 | Gabarro | Aug. 15, 1893 |
| 1,140,826 | Hoppie | May 25, 1915 |
| 1,366,298 | Teitelbaum | Jan. 18, 1921 |
| 2,090,966 | Sailer | Aug. 24, 1937 |
| 2,343,194 | Lawson | Feb. 29, 1944 |

FOREIGN PATENTS

| | | |
|---|---|---|
| 22,950 of 1892 | Great Britain | Mar. 11, 1893 |